United States Patent
Day, III et al.

(10) Patent No.: US 6,754,717 B1
(45) Date of Patent: Jun. 22, 2004

(54) ESTABLISHING COMPATIBILITY OF MESSAGES FOR COMMUNICATING BETWEEN PROCESSING ENTITIES WITH CONTINUOUS AVAILABILITY

(75) Inventors: Kenneth Fairclough Day, III, Tucson, AZ (US); Jonathan Wayne Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 09/693,813

(22) Filed: Oct. 23, 2000

(51) Int. Cl.[7] .............................................. G06F 15/16
(52) U.S. Cl. ...................... 709/248; 717/120; 717/170; 717/171; 709/203
(58) Field of Search ................................ 717/120, 121, 717/122, 170, 171; 707/203; 709/203, 223, 224, 248

(56) References Cited

U.S. PATENT DOCUMENTS

| | | | |
|---|---|---|---|
| 4,558,413 A | * 12/1985 | Schmidt et al. | 707/203 |
| 4,912,637 A | * 3/1990 | Sheedy et al. | 707/203 |
| 5,153,909 A | * 10/1992 | Beckle et al. | 379/265.03 |
| 5,333,266 A | 7/1994 | Boaz et al. | 395/200 |
| 5,452,420 A | * 9/1995 | Engdahl et al. | 710/105 |
| 5,499,109 A | 3/1996 | Mathur et al. | 358/400 |
| 5,524,137 A | 6/1996 | Rhee | 379/67 |
| 5,557,798 A | 9/1996 | Skeen et al. | 395/650 |
| 5,579,509 A | * 11/1996 | Furtney et al. | 703/27 |
| 5,594,721 A | 1/1997 | Pan | 370/392 |
| 5,634,114 A | * 5/1997 | Shipley | 717/170 |
| 5,732,275 A | * 3/1998 | Kullick et al. | 717/170 |
| 5,956,688 A | * 9/1999 | Kokubo et al. | 705/1 |
| 5,968,131 A | * 10/1999 | Mendez et al. | 709/246 |
| 6,101,540 A | * 8/2000 | Graf | 709/224 |
| 6,161,125 A | * 12/2000 | Traversat et al. | 709/203 |
| 6,263,497 B1 | * 7/2001 | Maeda et al. | 717/170 |
| 6,360,363 B1 | * 3/2002 | Moser et al. | 717/170 |
| 6,415,435 B1 | * 7/2002 | McIntyre | 717/108 |
| 6,425,125 B1 | * 7/2002 | Fries et al. | 717/168 |
| 6,651,249 B2 | * 11/2003 | Waldin et al. | 717/170 |
| 6,658,659 B2 | * 12/2003 | Hiller et al. | 717/170 |
| 2003/0159135 A1 | * 8/2003 | Hiller et al. | 717/166 |
| 2004/0015947 A1 | * 1/2004 | Gong et al. | 717/170 |

OTHER PUBLICATIONS

Shima et al., A New Method for Increasing the Reliability of Multiversion Software Systems Using Software Breeding, 1995, IEEE, pp. 202–208.*

(List continued on next page.)

*Primary Examiner*—David Wiley
*Assistant Examiner*—Thomas J Mauro, Jr.
(74) *Attorney, Agent, or Firm*—John H. Holcombe (57) ABSTRACT

A plurality of processing entities of a computer processing system employ messages for communicating with each other, and are updatable to newer versions at each of the processing entities by an initialization process. To maintain continuous availability, compatibility for the messages is established between the processing entities by maintaining, for message types, at each processing entity, identification values of the maximum and of the minimum versions of the message type supported at the entity. An initializing processing entity requests the maximum and minimum version identification values for the message types from other processing entities of the system. The initializing entity compares its maintained maximum and minimum version identification values to received maximum and minimum version identification values, and selects, as its current version, the maximum version whose identification value intersects with the maintained maximum and minimum version identification values and the maximum and the minimum version identification values of all the other processing entities.

24 Claims, 7 Drawing Sheets

OTHER PUBLICATIONS

McClatchey et al., Version Management in a Distributed Workflow Application, 1997, IEEE.*

Lindsay et al., A Generic Model for Fine Grained Configuration Management Including Version Control and Traceability, 1997, IEEE.*

Sciore, Versioning and Configuration Management in an Object–Oriented Data Model, 1994, VLDB Journal, 3, pp. 77–106.*

Agrawal et al., Modular Synchronization in Multiversion Databases: Version Control and Concurrency Control, 1989, ACM.*

Gupta, et al., Increasing System Availability through On–Line Software Version Change, 1993, IEEE.*

* cited by examiner

60 — PROCESSING ENTITY (X)

| MESSAGE IDENTIFIER | MINIMUM VERSION SUPPORTED | MAXIMUM VERSION SUPPORTED | CURRENT VERSION |
|---|---|---|---|
| 01 | 00 | 01 | 00 |
| 02 | 02 | 04 | 04 |
| 03 | 01 | 03 | 02 |
| ... | ... | ... | ... |
| ... | ... | ... | ... |
| 62 | 63 | 61 | 70 |

FIG. 6B

65 — PROCESSING ENTITY (A) AT P.E. (X)

| MESSAGE IDENTIFIER | MINIMUM VERSION SUPPORTED | MAXIMUM VERSION SUPPORTED |
|---|---|---|
| 01 | 00 | 00 |
| 02 | 02 | 04 |
| 03 | 00 | 02 |
| ... | ... | ... |
| 67 | 69 | 68 |

FIG. 6C

66 — PROCESSING ENTITY (B) AT P.E. (X)

| MESSAGE IDENTIFIER | MINIMUM VERSION SUPPORTED | MAXIMUM VERSION SUPPORTED |
|---|---|---|
| 01 | 00 | 00 |
| 02 | 02 | 04 |
| 03 | 00 | 02 |
| ... | ... | ... |
| 67 | 69 | 68 |

ESTABLISHING COMPATIBILITY OF MESSAGES FOR COMMUNICATING BETWEEN PROCESSING ENTITIES WITH CONTINUOUS AVAILABILITY

FIELD OF THE INVENTION

This invention relates to internal communication of computer processing systems having a plurality of processing entities, and, more particularly, to establishing the compatibility of messages which are employed for communication between the processing entities and which are updatable to newer versions.

BACKGROUND OF THE INVENTION

Computer processing systems may employ a plurality of processing entities, for example, as a means of providing redundancy of operation. As a specific example, a plurality of directors may provide redundant communication paths between host computer systems and redundant data storage libraries. The communication between the processing entities, such as the plurality of directors, typically is accomplished by means of specialized messages. From time to time, these messages are updated and changed in characteristics, for example, in format, as by expanding the number of bits or bytes in a portion of the message. As another example, the meaning of a message, or fields of that message, may be updated and changed. A serious change that would result in a misreading of the message by a receiver that has not been similarly updated is typically called a "version" change.

Typically, a message is updated to a new version by stopping the entire computer processing system and updating the message handling code of each of the processing elements at the same time, and then bringing the processing elements into operational status, all with the updated message handling code. This insures that each of the processing elements is able to communicate with each of the other processing elements and handle the new version of the message.

However, increasing importance is given to continuous operation of computer processing systems, for example, using the phrase "24×7×52". Stopping the computer processor system is not a reasonable expectation in a continuously operating computer processor system.

Hence, format or other version change updates are avoided if at all possible in continuously operating computer processor systems. This leads to inefficiencies in operation, and limits the upgradability of the system.

SUMMARY OF THE INVENTION

An object of the present invention is to establish the compatibility between processing entities of a computer processing system for internal communication messages in a non-disruptive manner, so as to allow the computer processing system to update the message handling and to maintain continuous operation.

Disclosed are a computer processing system and a computer implemented method for establishing compatibility between processing entities. The computer processing system has a plurality of processing entities which employ messages for communicating with each other, the messages comprising a plurality of message types, each of which is updatable to newer versions, e.g., to new formats, at each of the processing entities by an initialization process.

Each of the processing entities may support multiple versions of the message. Compatibility for the messages is established between the processing entities by maintaining at each of the processing entities, an identification value of the maximum version of the message supported at the entity for each of the message types. Also, at each of the processing entities, an identification value is maintained of the minimum version of the message supported at the entity for each of the message types.

At the initialization process of any processing entity, the initializing processing entity requests from other processing entities of the computer processing system, the maximum version identification value and the minimum version identification value for the message types. The initializing processing entity compares the maintained maximum and minimum version identification values of the entity to any received maximum version identification value and minimum version identification value for each of the received message types. The initializing processing entity selects, as its current version to be employed for the messages of each message type, the maximum version whose identification value intersects with the maintained maximum and minimum version identification values and the maximum and the minimum version identification values of all the other processing entities.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
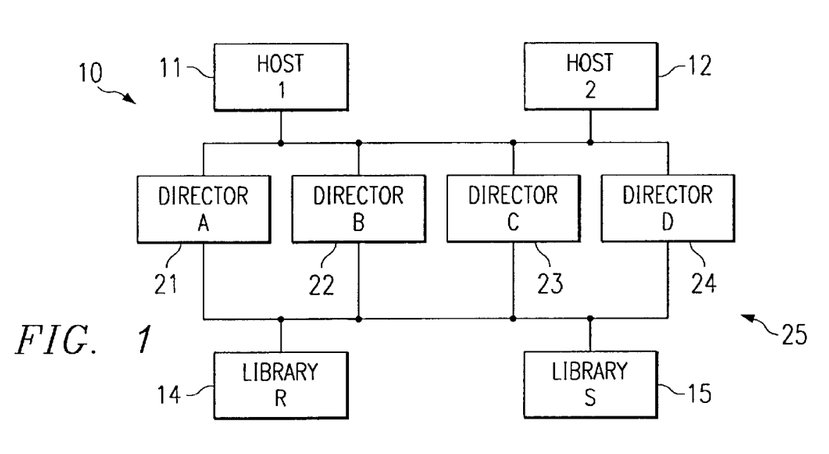
FIG. 1 is a block diagram illustrating an example of a computer processing system of a plurality of processing entities which may implement the message version handling of the present invention.

Referring to FIG. 1, an example of a computer processing system 10 is illustrated which employs a plurality of processing entities, for example, as a means of providing redundancy of operation. In the specific example, the computer processing system 10 redundantly couples a plurality of host systems 11 and 12 to redundant data storage libraries 14 and 15, via a plurality of directors 21–24 which employ a communication network 25. The communication between the processing entities, such as the plurality of directors 21–24, typically is accomplished by means of specialized messages. In order to accomplish the redundancy, a host system 11, 12 may select one of the directors 21–24 to store information in the data storage libraries 14, 15. The selected director 21–24 may employ the specialized messages to, first control storage of the information in one data storage library 14, 15, and then control copying of the information from the one data storage library to the other. The copying is accomplished by one of the directors 21–24, not necessarily the director that stored the information, having the information read from the one data storage library to be stored in the other data storage library. Typically, specialized messages are also used between the directors for status and control functions.

Examples of essential portions of ones of specialized messages used internally by the computer processor system 10 are illustrated in FIGS. 2A, 2B, 3A, 3B, 4A and 4B. The messages may be peer-to-peer and/or director to library. The communication network 25 may comprise a direct communication network directly coupling the processing entities, such as the directors, or may comprise an indirect communication network where messages are written to intermediate mailboxes and read by the receiving processing entities.

From time to time, these internal communication messages are updated in desired content, and, also may change in characteristics, for example, in format, such as by expanding the number of bits or bytes in a portion of the message. As another example, the meaning of a message, or fields of that message, may be updated and changed. As discussed above, such serious changes that would result in a misreading of the message by a receiver that has not been similarly updated comprises a new "version". In the instant example, the associated data storage libraries 14, 15 may be updated to have a significantly enlarged storage capability, and therefore any addresses involving the libraries will have to be altered by expanding the number of bytes for the addresses related to storage in the libraries.

Figure 2A:
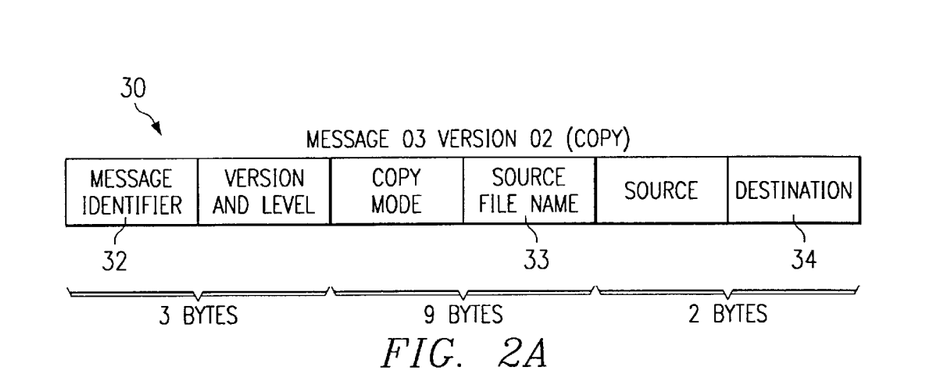
FIGS. 2A and 2B are diagrammatic illustrations representing, respectively, a version and an updated version of a message.
Figure 2B:
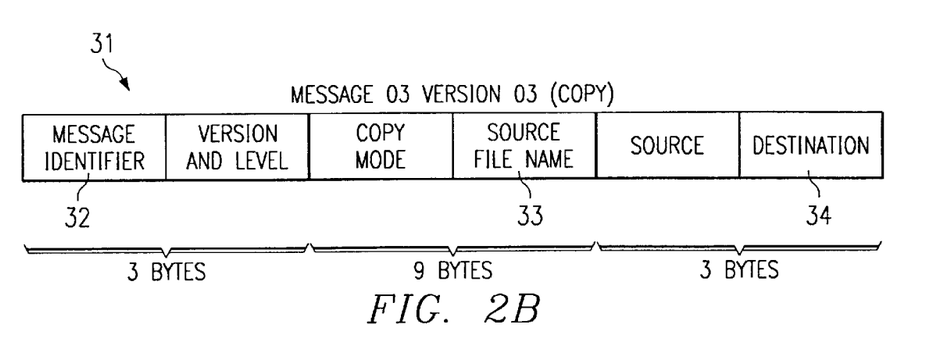

Thus, FIGS. 2A and 2B represent, respectively, examples of a version 30 and an updated version 31 of a specialized "COPY REQUEST" message from a director for queuing the request at each of the other directors. The sizes of the various elements of the messages are not to scale, and not all elements of the messages are illustrated. Typically, a message may have changes that do not involve a new version of the message. For example, bits that are not essential to the message itself, such as reserve bits or bytes, may have their meaning changed to carry information ancillary to the message. Typically, such a small change is called a "level" change, and does not require a new version of the message. A version change is a major change to the message, e.g., to the format, such that a message sent in the wrong version is not readable by the receiving processing entity.

In the example of FIGS. 2A and 2B, the essential elements of the message that are unchanged in the format of the new version are the message identifier and identity of the current version and level of the message 32 and the number of bytes 33 for the copy mode and name of the data. In the example, the current version and level of the message are carried as part of the message header. The change between the prior version 30 and the new version 31 is the number of bytes 34 representing the source of the data and the destination for the data, which is expanding from 1 byte to 2 bytes. As discussed above, this would be a typical version change for accommodating libraries with expanding storage capability.

Figure 3A:
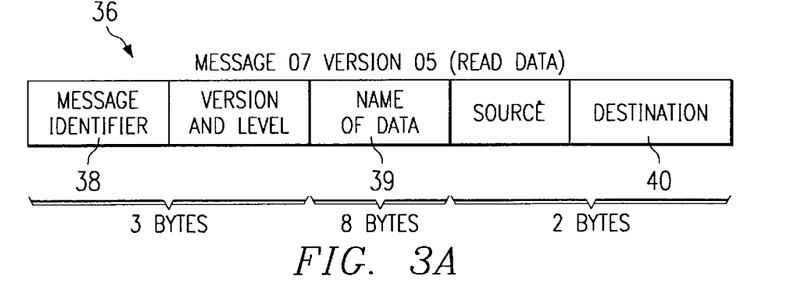
FIGS. 3A and 3B are diagrammatic illustrations representing, respectively, a version and an updated version of another message.
Figure 3B:
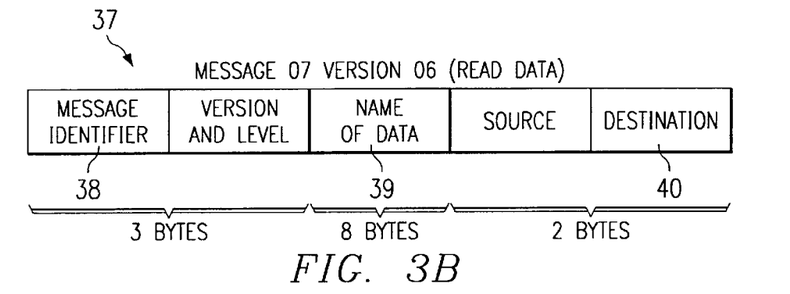

In the example of FIGS. 3A and 3B, a "TREAD DATA" message is illustrated with a prior version 36 and an updated version 37. In the example, the essential elements'of the message that are unchanged in the format of the new version are the message identifier 38, with the version and level, and the number of bytes 39 for the name of the data. The change between the prior version 36 and the new version 37 is the distribution of the bits 40 representing the source of the data and the destination for the data. This is also a typical version format change to make use of unused bits in one part of the address to provide added bits to the other part of the address. This format change, which is also a typical way to accommodate libraries with expanding storage capability, comprises a version change.

Figure 4A:
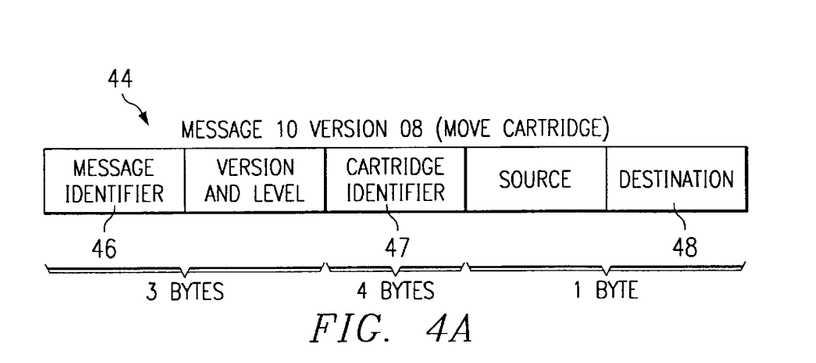
FIGS. 4A and 4B are diagrammatic illustrations representing, respectively, a version and an updated version of still another message.
Figure 4B:
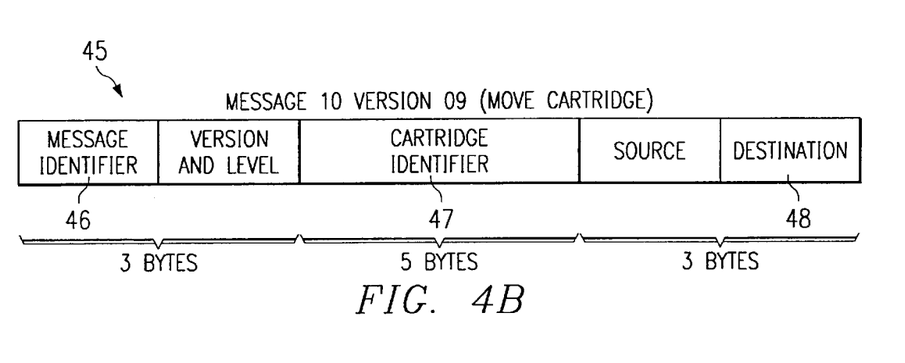

In the example of FIGS. 4A and 4B, a "MOVE CARTRIDGE" message is illustrated with a prior version 44 and an updated version 45. In the example, the essential element of the message that is unchanged in the format of the new version is the message identifier 46, with the version and level. The changes in format between the prior version 44 and the new version 45 are the number of bytes 47 for the cartridge identifier, which is expanding from 4 bytes to 5 bytes, and the number of bytes 48 representing the source of the data and the destination for the data, which is expanding from 1 byte to 3 bytes. This change would also be a typical version change for accommodating libraries with expanding storage capability.

Since the processing elements of the computer processing system 10 in FIG. 1, e.g., directors 21–24, work together to provide system redundancy, it is not possible for some of the directors to have one format for a necessary message at the same time one or more of the directors has a different format. The result would be a misreading of the intended message by the receiving processing entity or director. As discussed above, in the prior art, when messages were updated in characteristics, such as in format, to the extent that a version was changed, the messages were updated by stopping the computer processing system and updating the message handling code of each of the processing elements at the same time, and then bringing the processing elements into operational status, all with the updated message handling code. This would insure that each of the processing elements is able to communicate with each of the other processing elements.

However, the recent typical requirement for constant availability renders such an approach undesirable.

Figure 5:
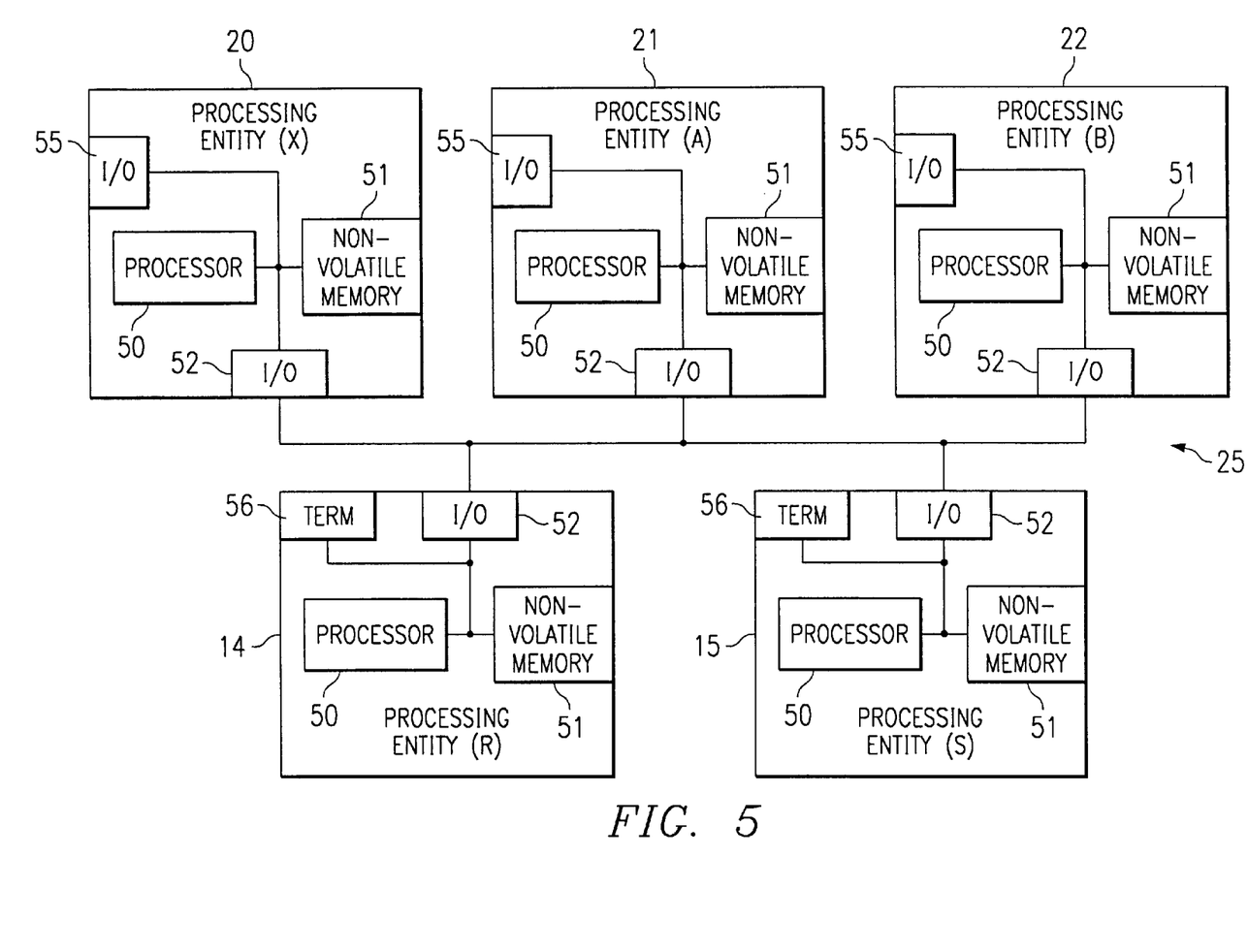
FIG. 5 is a block diagram illustrating a portion of the computer processing system of FIG. 1 arranged to implement the present invention.

FIG. 5 illustrates an example of a computer processing system of a plurality of processing entities implementing the message version handling of the present invention. The processing entities, for example, comprise two of the directors 21 and 22 of FIG. 1, and a third processing entity 20 may comprise one of the other directors of FIG. 1. In the example, processing entity 20 is the one of the processing entities that is being updated to the new version of one or more messages at an initialization in accordance with the present invention, while the other processing entities 21, 22 are not being initialized, and may continue processing on a continuous basis. Two additional processing entities are illustrated which may comprise the data storage libraries 14, 15. In accordance with the present invention, the computer processing system remains available during the initialization of processing entity 20.

In the example of FIG. 5, each of the processing entities comprises a processor 50, with or without a display, a nonvolatile memory 51, and at least one input/output interface 52 coupling the processing entity to the communication network 25, examples of which are known to those of skill in the art.

In the case of the directors 20–22, at least one additional input/output interface 55 is provided for communication with the host or hosts. In the case of the data storage libraries 14, 15, storage shelves and at least one accessor is provided, as is a terminal 56 for allowing an operator to interact with the library.

The processor 50 comprises at least one programmable computer processor, such as an IBM RS-6000 processor, and is provided with an operating system and application programs for operating in accordance with the present invention. The application programs may comprise a computer program product, comprising computer readable program code. The computer program product may be supplied electronically, as from a network or one of the hosts 11, 12 at input/output interface 55 for the processing entities 20–22, or via the directors 20–22 at the input/output interface 52 for the processing entities 14, 15. Alternatively, the computer program product may be supplied from a storage media which stores executable computer instructions, and comprises an article of manufacture, such as data storage media stored in the data storage libraries, or that may be provided at the terminal 56. Other examples of a storage media which are an article of manufacture comprise a magnetic diskette, read only memories (ROM) or programmable read only memories (PROM). Examples of data storage media are optical disk cartridges, magnetic tape cartridges, which may be stored in the data storage libraries. The requirement for the storage media, data storage media, or memories is that they store digital representations of computer executable instructions. The operating system and application programs for the processor 50 may be stored in the nonvolatile memory 51, which may comprise a hard disk drive.

Figure 6A:
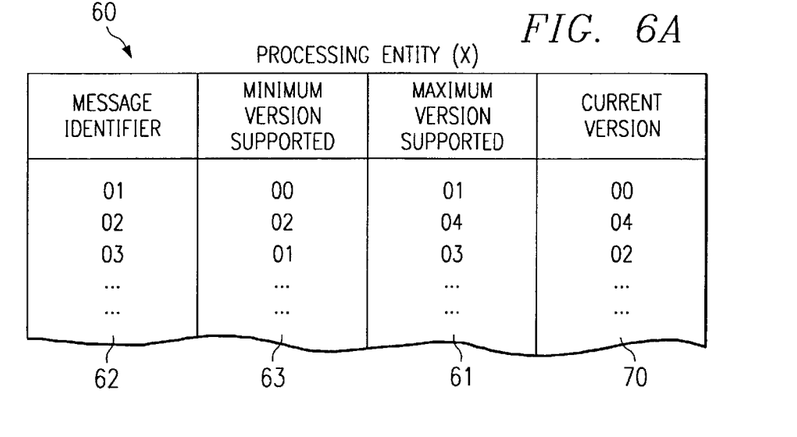
FIGS. 6A, 6B and 6C are diagrammatic illustrations representing tables of message versions in accordance with an embodiment of the present invention.
Figure 6B:
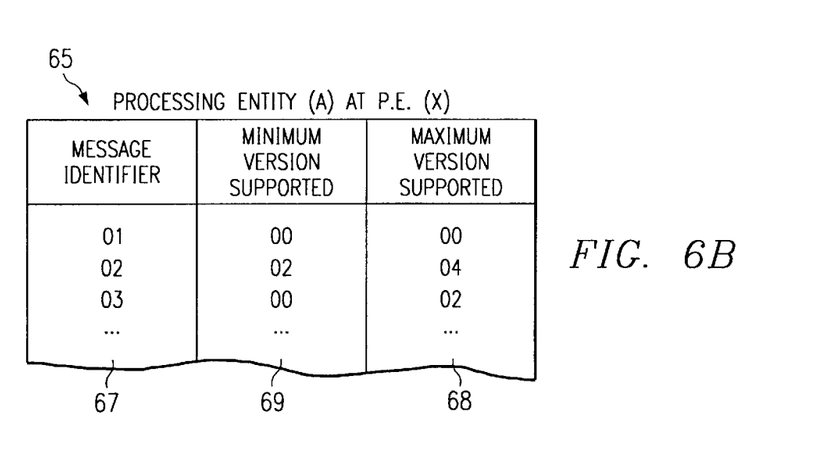
Figure 6C:
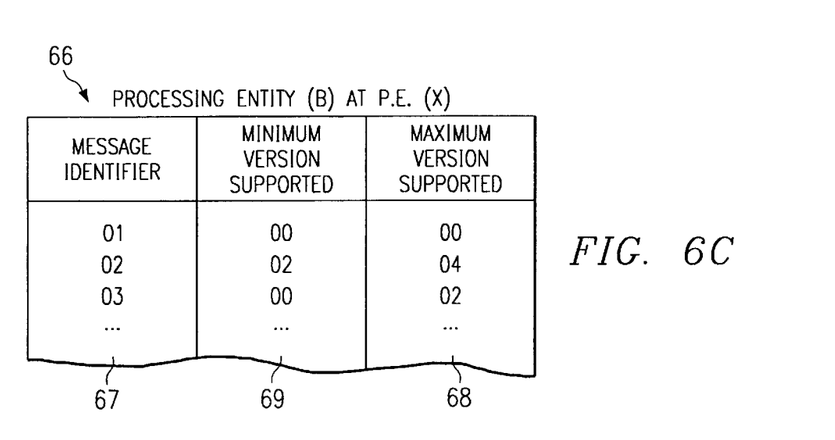

Referring to FIGS. 6A, 6B and 6C, in accordance with the present invention, each of the processing entities may support multiple versions of the message types. Compatibility for the messages is established between the processing entities by maintaining at each processing entity, for example in table 60, an identification value 61 of the maximum version of the message type 62 supported at the entity for at least ones of the message types. Also, at each of the processing entities, an identification value 63 is maintained of the minimum version of the message type supported at the entity for the message types.

At the initialization process of any processing entity to update its message to a new version for the message types, the initializing processing entity requests from other processing entities of the computer processing system, the maximum version identification value and the minimum version identification value for at least ones, but preferably all, of the message types. By requesting and receiving the maximum version identification value and the minimum version identification value for all of the message types, new messages may be identified. The received identification values may be stored, for example in tables 65 and 66. The message types are identified in column 67, the received maximum version identification values in column 68, and the received minimum version identification values in column 69. The initializing processing entity compares the maintained maximum and minimum version identification values 61, 63 of the entity to any received maximum version identification value 68 and minimum version identification value 69 for each of the message types. The initializing processing entity selects, as its current version 70 to be employed for the messages of each message type, the maximum version whose identification value intersects with the maintained maximum and minimum version identification values 61, 63 and the maximum and the minimum version identification values 68, 69 of all the other processing entities.

Figure 7:
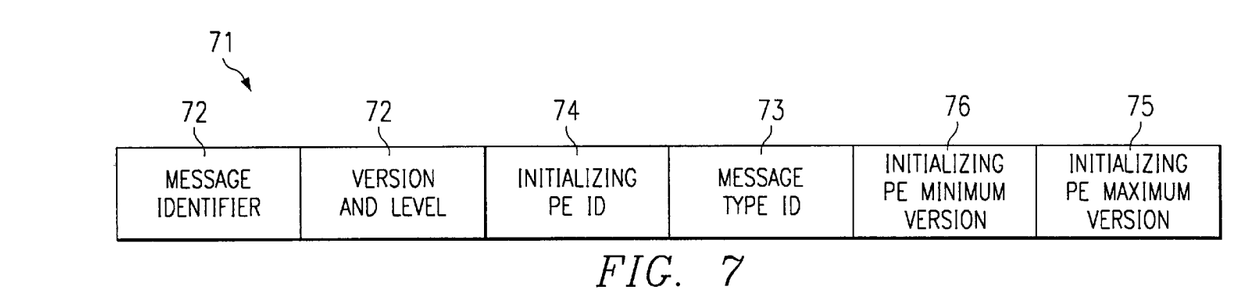
FIG. 7 is a diagrammatic illustration of a message requesting supported versions of messages in accordance with an embodiment of the present invention.

FIG. 7 illustrates an example of a message 71 sent by an initializing processing entity to request from other processing entities of the computer processing system, the maximum version identification value and the minimum version identification value for the message types. The exemplary message comprises a message identifier 72 which identifies the request message, and an identifier 73 of each of the message types included in the request message. So that any response to the request is returned to the initializing processing entity, an identifier 74 of the initializing processing entity is provided. As another example, the request message may identify a group of message types comprising a subset of the message types. The request may identify more or fewer message types than are provided at the other processing entities to ultimately accommodate the introduction of new message types. A string of separate request messages may be provided, one for each message type, or all message types may be grouped into a single request message.

As discussed above with respect to FIGS. 6B and 6C, in accordance with the present invention, each processing entity maintains the maximum and minimum version identification values for each of the message types for each of the other processing entities, e.g., in tables 65, 66. Thus, in the request message 71, the initiating processing entity additionally provides the maximum version identification value 75 and minimum version identification value 76 for each identified message type of the initiating processing entity. Each other processing entity receiving the request message 71 then is able to update the maximum and minimum version identification values in the table 65, 66 for the initializing processing entity. The message 71 may comprise a separate grouping of a message type identifier 73, maximum version identification value 75, and minimum version identification value 76 for each message type, or may comprise ordered lists of each.

Figure 8:
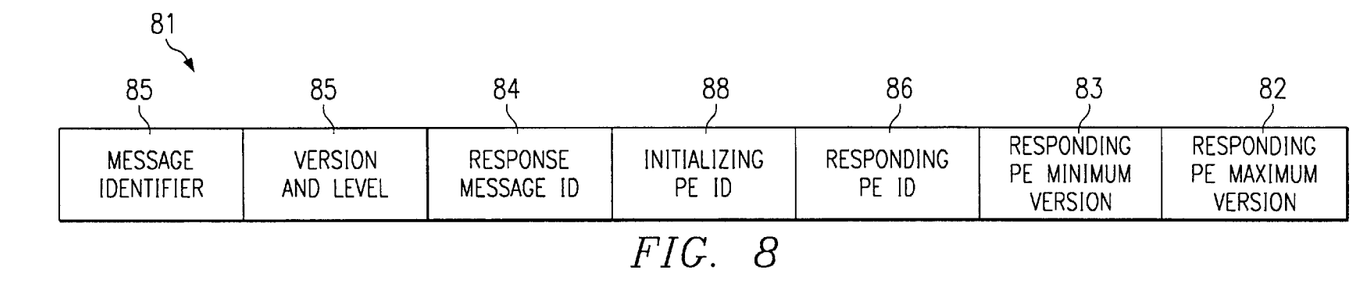
FIG. 8 is a diagrammatic illustration of a message responding to the request message of FIG. 7, in accordance with an embodiment of the present invention.

FIG. 8 illustrates an example of a response message 81 sent by one of the other processing entities in response to the request message 71 of FIG. 7. The other processing entity provides the maximum version identification value 82 and the minimum version identification value 83 for each message type 84 included in the response message. The response message 81 is identified by a message identifier 85 (preferably with the version and level), the other processing entity sending the response message is identified 86, and the initializing processing entity that sent the request message and to which the response message is addressed, is also identified 88. A string of separate response messages may be provided, one for each message type, or all message types may be grouped into a single response message. As discussed above, in a single message, the message type identifier 84, and maximum and minimum version identification values 82, 83 may be grouped together for each message type, or may comprise ordered lists of each.

Referring to FIG. 7, the other processing entities additionally compare the updated maximum and minimum version identification values 75, 76 identified for the message types of the initializing processing entity to the maximum and minimum version identification values of the tables 60, 65 and 66 maintained at the other processing entity. If, as the result of the comparison, it is determined that the maximum and minimum identification values of the initiating processing entity fail to intersect with those of all other processing entities for any message type, the other processing entity sends a message 91 to the initiating processing entity informing the processing entity that it is incompatible with the message communication for that message type. Thus, the non-compatible message 91 comprises a message identifier 92, and provides the identifier 93 of the message which is non-compatible, the identifier 95 of the processing entity that is non-compatible, and the identifier 97 of the processing entity that is sending the message. If more than one message type is non-compatible, the identifiers 92 may be supplied in a single message, or multiple non-compatibility messages 91 may be sent.

Figure 9:
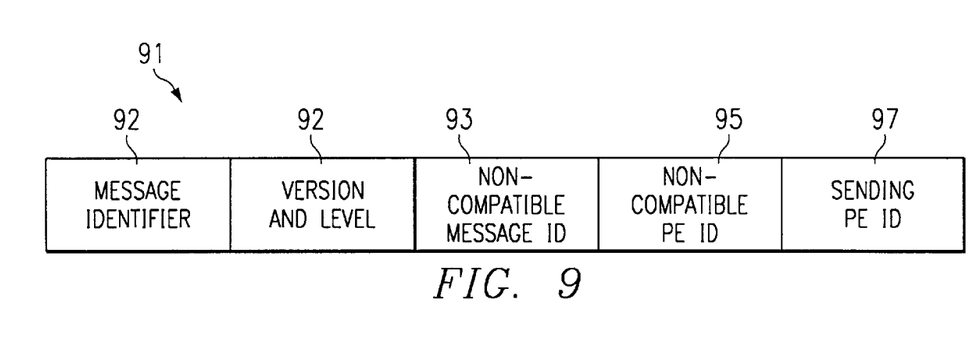
FIG. 9 is a diagrammatic illustration of a message indicating non-compatibility of a message handler in accordance with an embodiment of the present invention.

As an alternative, the types of messages may be arranged in subsets or groups, and request messages 71, response messages 81, and non-compatibility messages 91 may relate to only a key subset of message types. A minimal group of message types that are critical or important to successful operation of the computer processing system must be included in any such subset of message types that are subject to the compatibility process.

Figure 10:
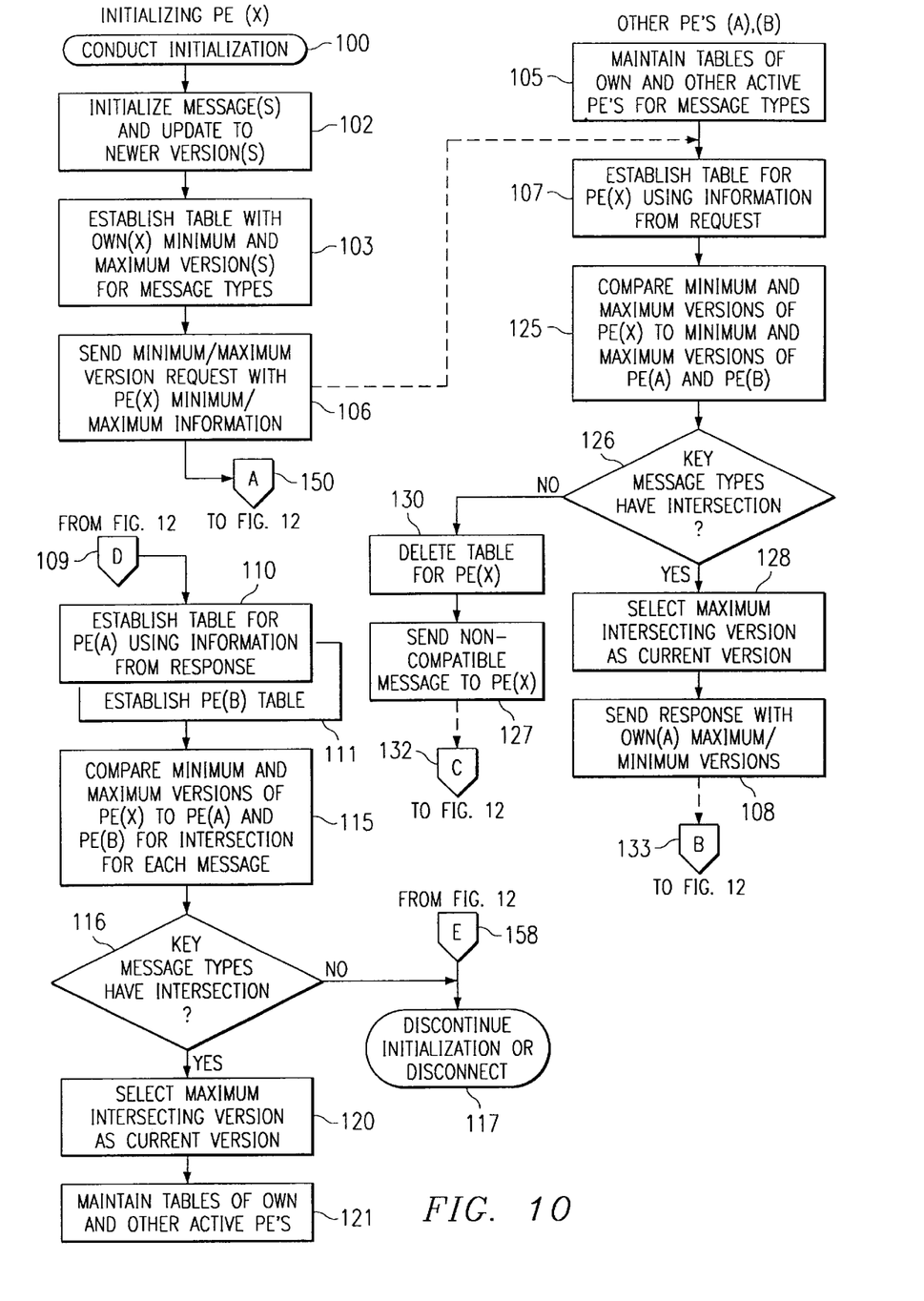
FIG. 10 is a flow chart depicting an embodiment of the method for establishing compatibility of messages for the computer processing system of FIG. 5 in accordance with the present invention.

FIG. 10 represents an embodiment of the method of the present invention, illustrating the operation of both the initializing processing entity and one of the other processing entities that responds to a request from the initializing processing entity. In the exemplary embodiment, the initialization of one of the processing entities, e.g., of FIG. 5, begins at step 100. Referring additionally to FIG. 5, the exemplary processing entity to be initialized is processing entity 20, while processing entities 21 and 22 are the responding processing entities and continue the normal operation of the computer processing system during the initialization of the processing entity 20. Thus, one or more messages of the computer processing system may be updated to a new version at one of the processing entities at a time while the computer processing system remains in operation, without requiring that the entire computer processing system be brought off-line and all processing entities updated at the same time.

Specifically, in step 102, the initializing processing entity 20 is initialized to the new version of at least one message, while retaining the capability to support at least one prior version of each message. If the message has been updated to a new version more than this one time, it is preferable to maintain the capability to support the most recent (newest) version and two immediately previous versions. Thus, with a span of three supported versions, there is little chance that a processing entity will be non-compatible.

Referring additionally to FIG. 6A, in step 103, the initializing processing entity 20 establishes (updates) a table 60 with it own minimum and maximum version identifiers for the messages.

Preferably all messages are subject to the update process. For example, the initializing processing entity 20 will send the request message 71 at the minimum supported version, with the expectation that the message will be recognized by the other processing entities. If not, there will be no response. Thus, receipt of response messages 81 from the other processing entities indicates compatibility.

Some of the processing entities will employ different messages for communication than will others. For example, the directors 20–22 may employ a different set of messages to communicate with each other, than they employ to communicate with the libraries 14, 15. Thus, the directors may have three sets of tables 60, 65, 66, one set for messages that are employed to communicate with both the other directors and with the libraries, one set for messages that are employed to communicate only with the other directors, and one set for messages that are employed only to communicate with the libraries. In the instant example of FIG. 10, only the processing entities 20–22 are considered.

In step 105, the other processing entities 21, 22 maintain tables 60, 65, 66 of their own and other active processing entities for the message types. The tables for processing entities which become inactive will be discussed hereinafter.

In step 106, the initializing processing entity 20 sends the message 71 of FIG. 7 to request from other processing entities 21, 22 of the computer processing system, the maximum version identification value and the minimum version identification value for all message types. The exemplary message comprises a message identifier 72 which identifies the request message, and identifiers 73 of the message types of the initializing processing entity. So that any response to the request is returned to the initializing processing entity, an identifier 74 of the initializing processing entity is provided. Additionally, the request message provides the maximum version identification value 75 and minimum version identification value 76 for each identified message type of the initiating processing entity 20. In step 107, each other processing entity 21, 22 receiving the request message or messages 71 then establishes a table 65 or 66 for the identified message types 67 for the initializing processing entity 20, with the maximum and minimum version identification values 68, 69.

The other processing entities 21, 22 each may send a response message 81 of FIG. 8, in response to the request message 71 of FIG. 7 to the initializing processing entity 20. Receipt of the response messages 81 from at least one other processing entity is depicted by connector 109. The actions of the other processing entities 21, 22, and the actions of the initializing processing entity 20 as the result of no response or receipt of a non-compatibility message will be discussed hereinafter.

In the response message 81, the other processing entity provides its maximum version identification value 82 and the minimum version identification value 83 for the message type 84 identified in the request message, employing the values 61 and 63 of its table 60. Additionally, the response message 81 will include any new message type of the group not identified in the request message. The response message 81 is identified by a message identifier 85, the other processing entity sending the response message 21, 22 is identified 86, and the initializing processing entity 20 that sent the request message is also identified 88, as the identifier of the addressed processing entity which is to receive the response message.

In steps 110 and 111, the initializing processing entity 20 receiving the response message then establishes (updates)

the tables 65, 66 for each of the responding other processing entities 21, 22 with the maximum and minimum version identification values 68, 69 for each message type 67 of the response messages.

Thus, in step 115, the initializing processing entity 20 compares the maintained maximum and minimum version identification values 61, 63 of the processing entity of table 60 to any received maximum version identification value 68 and minimum version identification value 69 for each message type from tables 65 and 66 from all responding other processing entities.

Then, in step 116, the initializing processing entity determines whether all or a key subset of message types have an intersection with the maintained maximum and minimum version identification values 61, 63 and maximum and minimum version identification values 68, 69 of all the other processing entities 21, 22. If there is no intersection, "NO" in step 116, the initialization of the initializing processing entity 20 may have been conducted incorrectly and moved several versions away from the other processing entities, or may have been an initialization of the wrong messages. In any of these circumstances, it is not possible for the initializing processing entity 20 to accurately communicate with the other processing entities 21, 22, and, in step 117, the initializing processing entity discontinues the initialization and/or disconnects from the communication network 25.

If the key subset of messages all intersect with those of the other processing entities, each of the message types for which a response was received is treated separately. If any of the received response messages do not include a non-key message type of the initiating processing entity 20, or if there is no intersection with the other processing entities for the non-key message type, the initiating processing entity sets the version to 0, so that the message type is not used.

If, in step 116, initializing processing entity 20 determines that at least one version of a message intersects with the versions of the initializing and all other processing entities, the initializing processing entity, in step 120, selects as the current version to be employed by the initializing processing entity for the messages of each message type, the maximum version whose identification value intersects with the maintained maximum and minimum version identification values and the maximum and minimum version identification values of all the other processing entities 21, 22. Then, in step 121, the initializing processing entity 20 updates its table 60 with the current version 70 selected in step 120, and maintains the tables 65, 66 as needed.

In step 125, the other processing entities 21, 22 compare the maintained maximum and minimum version identification values 61, 63 of the processing entity of their own table 60 to the maximum version identification values 68 and minimum version identification values 69 both received from the initializing processing entity 20 and established in a table in step 107, and maintained for the other processing entity 21, 22 for each message type from tables 65 and 66.

It is possible that two of the processing entities cannot communicate directly, but that a third processing entity can communicate with both. Hence, in step 126, each other processing entity 21, 22 determines whether all or a key subset of message types have version identification values that intersect with the maintained maximum and minimum version identification values 61, 63 and maximum and minimum version identification values 68, 69 of all the other processing entities, including the initializing processing entity 20. If there is no intersection, "NO" in step 126, the step serves as a back up to step 116, and indicates that the initialization of the initializing processing entity 20 may have been conducted incorrectly and moved several versions away from the other processing entities, or may have been an initialization of the wrong messages. In any of these circumstances, it is not possible for the initializing processing entity 20 to accurately communicate with the other processing entities 21, 22. Thus, in step 130, the other processing entity deletes the table established in step 107, and, in step 127, the other processing entity sends the non-compatible message 91 of FIG. 9 to the initializing processing entity 20 at connector 132. Additionally, the non-compatibility message of step 127 may be sent at any time that a processing entity determines that one of the processing entities has no intersecting version of a messages.

If, in step 126, the other processing entity 21, 22 determines that all or a key subset of the message types intersect with the versions of the initializing and all other processing entities, the other processing entity treats each message type separately, and, in step 128, selects as the current version to be employed by the other processing entity for the messages of each message type, the maximum version whose identification value intersects with the maintained maximum and minimum version identification values and the maximum and minimum version identification values of all the other processing entities 20–22, and updates its table 60 with the current version 70 selected in step 128.

Then, in step 108, the other processing entity 21, 22 sends a response message 81 of FIG. 8 to the initializing processing entity 20, as depicted by connector 133. As discussed above the other processing entity will include in the response message, any new message type not identified in the request message 71 of FIG. 7.

Thus, all of the processing entities 20–22 employ as the current version 70 of each message, the maximum version whose identification value intersects with the maintained maximum and minimum version identification values and the maximum and minimum version identification values of all the other processing entities.

As specific examples, referring to tables 60, 65 and 66 of FIGS. 6A, 6B and 6C, the maximum intersecting version value for message "01" is version level "00", the maximum intersecting version value for message "02" is version level "04", and the maximum intersecting version value for message "03" is version level "02". Thus, even though only one of the processing entities has been updated to a new version for at least one message, e.g., messages "01" and "03" while the other processing entities were not updated, each of the processing entities 20–22 will have selected the maximum versions supported by all of the processing entities as the current version, and all of the processing entities 20–22 are compatible and are able to communicate correctly, without requiring that the computer processing system be taken off-line.

Figure 11:
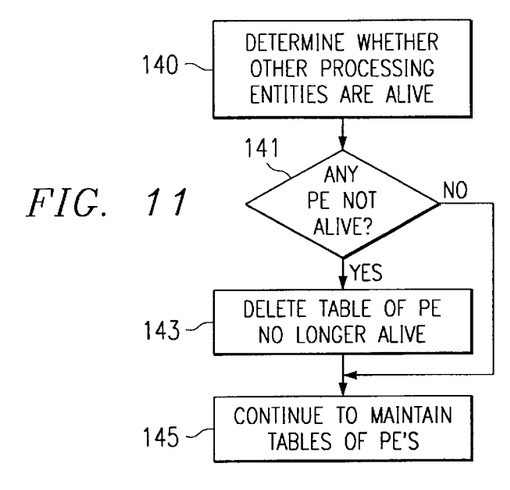
FIG. 11 is a flow chart depicting an embodiment of a method for determining an inactive processing entity for the computer processing system of FIG. 5 in accordance with an aspect of the present invention.

FIG. 11 illustrates the method in accordance with the present invention when one of the processing entities is taken off-line, either for the initialization or for any other reason. In step 140, the processing entity determines whether the other processing entities are alive. As an example, each of the processing entities may send a "heartbeat" message to the other processing entities on a periodic basis, and the absence of a "heartbeat" message within a predetermined window will trigger the other processing entities to conduct step 140. Step 141 comprises the determination whether any of the other processing entities is not alive. Since a processing entity may be "sleeping" but alive, the determination of step 141 may comprise inquiring of a watchdog timer to see if it has timed out. If one processing entity is determined to not be alive, "YES" in step 141, the table 65, 66 of FIG. 6B or 6C for that processing entity is deleted in step 143. Steps 125, 126 and 128 of FIG. 10 may then be repeated for the processing entities remaining active in the computer processing system, as illustrated by step 145. If all of the processing entities remain alive, "NO" in step 141, normal maintenance of the tables is conducted as needed in step 145.

Figure 12:
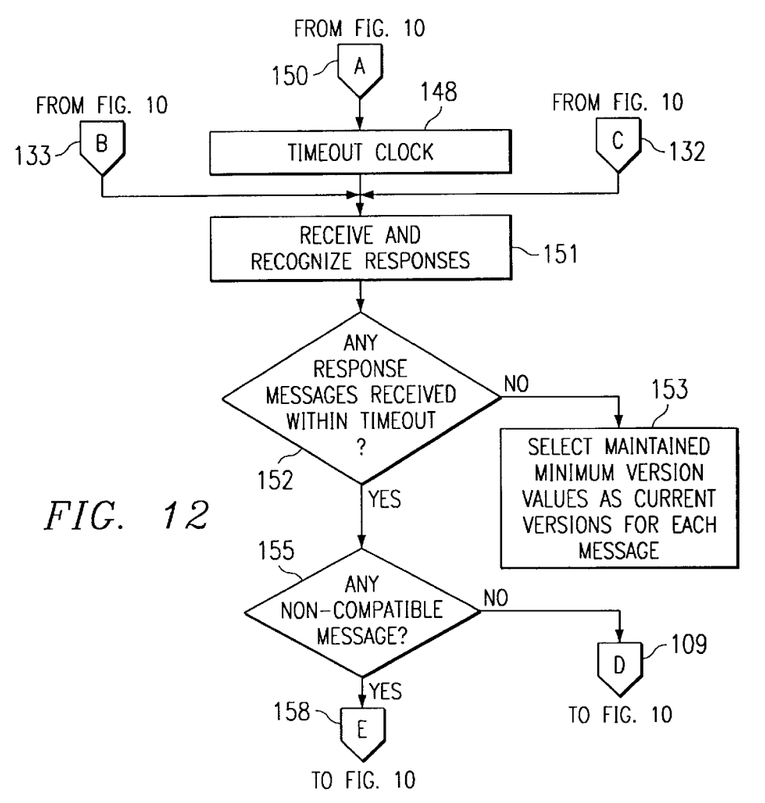
FIG. 12 is a flow chart depicting an embodiment of a method of the present invention for receiving responses in the computer processing system of FIG. 5 in accordance with an aspect of the present invention.

Referring to FIGS. 5, 10, and 12, connector 150 leads from FIG. 10 to FIG. 12, where, in step 148, a timeout clock is started to determine whether the initializing processing entity 20 is the only active processing entity on the communication network 25. This situation can only occur as the computer processing system is first initialized. In FIG. 12, connector 133 represents the response message 81 of FIG. 8 from the other processing entity, and connector 132 represents the non-compatibility message 91 of FIG. 9 from the other processing entity. In step 151, the initializing processing entity 20 receives the messages from the other processing entities 21, 22, and recognizes compatible response and non-compatibility messages.

In step 152, the initializing processing entity determines whether any compatible response message was received within the timeout period of timeout clock 148. If not, the initializing processing entity is the only active processing entity on the communication network 25. Thus, in step 153, the initializing processing entity 20 selects its maintained minimum version values, e.g., from column 63 of table 60 of FIG. 6A, as the current version for each message. The selection of the minimum version values is deemed most likely to achieve subsequent compatibility with the other processing entities when they initialize.

If one or more response messages were received, step 155 determines whether any non-compatible message 91 of FIG. 9 was received from an other processing entity 21, 22. If not, connector 109 leads to FIG. 10, so that the response messages 81 of FIG. 8 may be employed by the initializing processing entity 20.

If step 155 determines that a non-compatible message for a key subset was received, connector 158 leads to FIG. 10. The non-compatible message indicates that the initializing processing entity 20 cannot accurately communicate with the other processing entities 21, 22. Thus, the initializing processing entity, if it has not already done so, in step 117, discontinues the initialization and/or disconnects from the communication network 25 and ceases operational communication with the other processing entities.

Those of skill in the art will understand that the order and precise content of the specific steps of FIGS. 10 and 11 may be altered, and that various communication network systems, computer processing systems and processing entities may be employed for implementing the present invention.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a computer processing system having a plurality of processing entities which employ messages for communicating with each other, said messages comprising a plurality of message types, each of which is updatable to newer versions at each of said processing entities by an initialization process, a method for establishing compatibility between said processing entities for said messages, comprising the steps of:
    maintaining, for at least one of said message types, at each of said processing entities, an identification value of the maximum version of said message type supported at said processing entity;
    maintaining at each of said processing entities, an identification value of the minimum version of said message type supported at said processing entity for said at least ones of said message types;
    at said initialization process of any said processing entity, said initializing processing entity requesting from other said processing entities of said computer processing system, said maximum version identification value and said minimum version identification value for at least ones of said message types;
    said initializing processing entity comparing said maintained maximum and minimum version identification values of said processing entity to the requested said maximum version identification value and said minimum version identification value for the requested message types; and
    selecting as a maximum current version to be employed by said initializing processing entity for said messages of said message types, the maximum current version whose identification value intersects with said maintained maximum and minimum version identification values and said maximum and said minimum version identification values of all said other processing entities.

2. The method for establishing message compatibility of claim 1, wherein said selecting step additionally comprises, first determining whether, for each message type of a predetermined subset of message types, any said version identification value intersects with all said other processing entities; and, if at least one said version identification value intersects with all said other processing entities for each said message type, selecting said current version; else, discontinuing said initialization process.

3. The method for establishing message compatibility of claim 1, additionally comprising the steps of:
    each said processing entity maintaining said maximum and minimum version identification values for each of said message types for each of said other processing entities;
    said initiating processing entity additionally providing said maximum and said minimum version identification values for said message types of said initiating processing entity; and
    each other said processing entity updating said maximum and minimum version identification values for said initializing processing entity.

4. The method for establishing message compatibility of claim 3, wherein said other processing entities additionally conduct said comparing and selecting steps to include said updated maximum and minimum version identification values for said initializing processing entity.

5. The method for establishing message compatibility of claim 4, additionally comprising the steps of:
    in said comparing step of said other processing entities, determining whether, for each message type of a predetermined subset of message types, any said initiating processing entity said version identification value fails to intersect with all said other processing entities; and upon said initiating processing entity said version identification value failing to intersect with all said other processing entities for each said message type, sending a message to said initializing processing entity informing said processing entity that it is incompatible with said message communication.

6. The method for establishing message compatibility of claim 5, additionally comprising the steps of:
any said processing entity receiving said incompatibility message, ceasing operational communication with other said processing entities.

7. The method for establishing message compatibility of claim 1, additionally comprising the steps of:
each said processing entity maintaining said maximum and minimum version identification values for each of said message types for each of said other processing entities; and
each said processing entity determining whether each other said processing entity remains in operational communication, and, upon determining that any said other processing entity fails to remain in said operational communication, deleting all said maximum and minimum version identification values for said other processing entity.

8. The method for establishing message compatibility of claim 1, wherein, in said comparing step, upon said initializing processing entity failing to receive said requested maximum version identification value and said minimum version identification value from any other said processing entity, in said selecting step, selects said maintained minimum version identification value.

9. A computer processing system comprising:
a message communication network for allowing communication between processing entities; and
a plurality of processing entities, each coupled to said message communication network, employing messages for providing said communication between said plurality of processing entities at said message communication network, said messages comprising a plurality of message types, and for initialization updating of said messages to newer versions, each said processing entity:
maintaining, for at least one of said message types, an identification value of the maximum version of said message type supported at said processing entity;
maintaining an identification value of the minimum version of said message type supported at said processing entity for said at least ones of said message types;
requesting, at said initialization process of any said processing entity, from other said processing entities of said computer processing system, said maximum version identification value and said minimum version identification value for said message types;
comparing, at said initializing processing entity, said maintained maximum and minimum version identification values of said processing entity to the requested said maximum version identification value and said minimum version identification value for the requested message types; and
selecting as a maximum current version to be employed by said initializing processing entity for said messages of said message types, the maximum current version whose identification value intersects with said maintained maximum and minimum version identification values and said maximum and said minimum version identification values of all said other processing entities.

10. The computer processing system of claim 9, wherein said processing entity, in selecting said current version of said message, first determines whether, for each message type of a predetermined subset of message types, any said version identification value intersects with all said other processing entities; and, if at least one said version identification value intersects with all said other processing entities for each said message type, selects said current version; else, discontinues said initialization process.

11. The computer processing system of claim 9, wherein said processing entity additionally:
maintains, at each said processing entity, said maximum and minimum version identification values for each of said message types for each of said other processing entities;
provides, at said initiating processing entity, said maximum and said minimum version identification values for said message types of said initiating processing entity; and
updates, at each other said processing entity, said maximum and minimum version identification values for said initializing processing entity.

12. The computer processing system of claim 11, wherein said other processing entities additionally conduct said comparison and selection to include said updated maximum and minimum version identification values for said initializing processing entity.

13. The computer processing system of claim 12, wherein said processing entity additionally:
in said comparison of said other processing entities, determines whether, for each message type of a predetermined subset of message types, said initiating processing entity said version identification value fails to intersect with all said other processing entities; and
upon said initiating processing entity said version identification value failing to intersect with all said other processing entities for each said message type, sends a message to said initializing processing entity informing said processing entity that it is incompatible with said message communication.

14. The computer processing system of claim 13, wherein said processing entity additionally:
at any said processing entity, upon receiving said incompatibility message, ceases operational communication with other said processing entities.

15. The computer processing system of claim 9, wherein said processing entity additionally:
maintains, at each said processing entity, said maximum and minimum version identification values for each of said message types for each of said other processing entities; and
determines, at each said processing entity, whether each other said processing entity remains in operational communication, and, upon determining that any said other processing entity fails to remain in said operational communication, deletes all said maximum and minimum version identification values for said other processing entity.

16. The computer processing system of claim 9, wherein said processing entity, in said comparison, upon said initializing processing entity failing to receive said requested maximum version identification value and said minimum version identification value from any other said processing entity, in said selection, selects said maintained minimum version identification value.

17. A computer program product usable with a programmable computer having computer readable program code embodied therein, for use with processing entities of a computer processing system, said computer processing system having a plurality of said processing entities; and said computer processing system having a message communication network coupled to each of said plurality of processing entities, for allowing communication between said plurality of processing entities; each of said processing entities employing messages for providing said communication between said plurality of processing entities at said message communication network, said messages comprising a plurality of message types, and for initialization updating of said messages to newer versions, said computer program product comprising:

computer readable program code which causes each of said processing entities to maintain, for at least one of said message types, an identification value of the maximum version of said message type supported at said processing entity;

computer readable program code which causes each of said processing entities to maintain an identification value of the minimum version of said message type supported at said processing entity for said at least ones of said message types;

computer readable program code which causes said processing entities to, at said initialization process of any said processing entity, request from other said processing entities of said computer processing system, said maximum version identification value and said minimum version identification value for said message types;

computer readable program code which causes said processing entities to, at said initializing processing entity, compare said maintained maximum and minimum version identification values of said processing entity to the requested said maximum version identification value and said minimum version identification value for the requested message types; and computer readable program code which causes said processing entities to, at said initializing processing entity, select as a maximum current version to be employed by said initializing processing entity for said messages of said message types, the maximum current version whose identification value intersects with said maintained maximum and minimum version identification values and said maximum and said minimum version identification values of all said other processing entities.

18. The computer program product of claim 17, wherein said computer readable program code which causes said computer processor to select said current version additionally causes said computer processor to, first determine, for each message type of a predetermined subset of message types, whether any said version identification value intersects with all said other processing entities; and, if at least one said version identification value intersects with all said other processing entities for each said message type, select said current version; else, discontinue said initialization process.

19. The computer program product of claim 17, additionally comprising:

computer readable program code which causes said computer processor to, at each said processing entity, maintain said maximum and minimum version identification values for each of said message types for each of said other processing entities;

computer readable program code which causes said computer processor to, at said initiating processing entity, additionally provide said maximum and said minimum version identification values for said message types of said initiating processing entity; and computer readable program code which causes said computer processor to, at each other said processing entity, update said maximum and minimum version identification values for said initializing processing entity.

20. The computer program product of claim 19, additionally comprising computer readable program code which causes said processing entities to, at said other processing entities conduct said comparison and selection, including said updated maximum and minimum version identification values for said initializing processing entity.

21. The computer program product of claim 20, additionally comprising:

computer readable program code which causes said processing entities to, in said comparison of said other processing entities, determine, for each message type of a predetermined subset of message types, whether said initiating processing entity said version identification value fails to intersect with all said other processing entities; and computer readable program code which causes said processing entities to, upon said initiating processing entity said version identification value failing to intersect with all said other processing entities for each said message type, send a message to said initializing processing entity informing said processing entity that it is incompatible with said message communication.

22. The computer program product of claim 21, additionally comprising:

computer readable program code which causes said processing entities to, at any said processing entity receiving said incompatibility message, cease operational communication with other said processing entities.

23. The computer program product of claim 17, additionally comprising:

computer readable program code which causes each said processing entity to maintain said maximum and minimum version identification values for each of said message types for each of said other processing entities; and computer readable program code which causes each said processing entity to determine whether each other said processing entity remains in operational communication, and, upon determining that any said other processing entity fails to remain in said operational communication, to delete all said maximum and minimum version identification values for said other processing entity.

24. The computer program product of claim 17, wherein, said computer readable program code which causes said processing entities to conduct said comparison, causes said processing entities, upon said initializing processing entity failing to receive said requested maximum version identification value and said minimum version identification value from any other said processing entity, in said selection, select said maintained minimum version identification value.

* * * * *